Dec. 23, 1969   H. H. GARDNER   3,484,996
APPARATUS FOR SURFACE GRINDING GENERALLY SPHERICAL ELEMENTS
Filed July 11, 1966

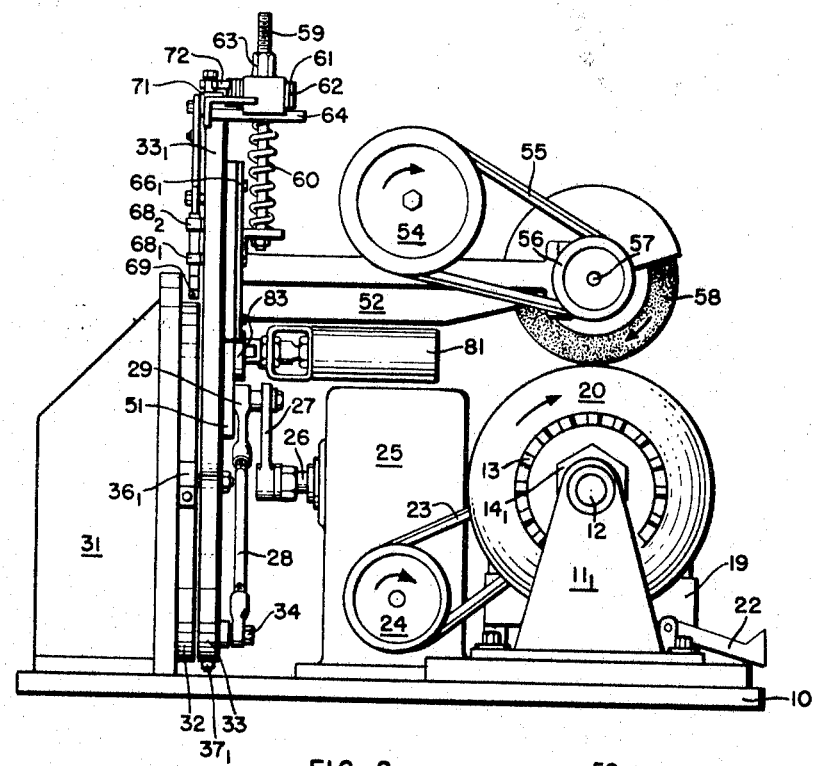
FIG. 2
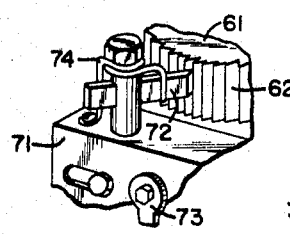
FIG. 3A
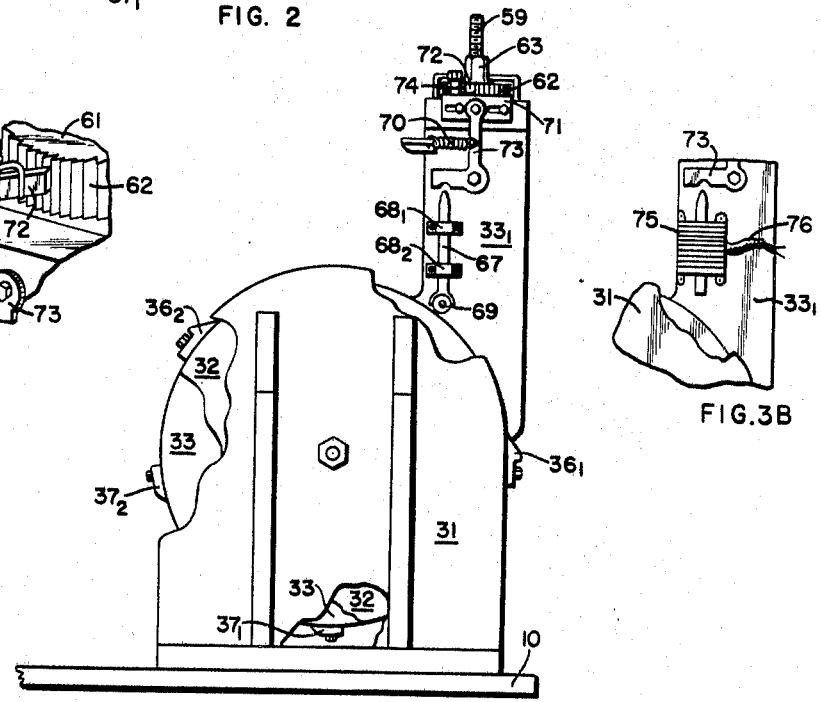
FIG. 3
FIG. 3B

United States Patent Office 3,484,996
Patented Dec. 23, 1969

3,484,996
APPARATUS FOR SURFACE GRINDING
GENERALLY SPHERICAL ELEMENTS
Henry H. Gardner, Baton Rouge, La., assignor to Ethyl
 Corporation, New York, N.Y., a corporation of
 Virginia
Continuation-in-part of application Ser. No. 312,241,
 Sept. 27, 1963, now Patent No. 3,300,905, dated
 Jan. 31, 1967. This application July 11, 1966, Ser.
 No. 564,208
Int. Cl. B24b 11/04
U.S. Cl. 51—33                                6 Claims

ABSTRACT OF THE DISCLOSURE

Apparatus for surface grinding general spherical elements of varying diameters by controlled radial movement and locking of the grinding and finishing means.

CROSS REFERENCE TO RELATED APPLICATIONS

This application is a continuation-in-part of copending application S.N. 312,241, filed Sept. 27, 1963, now U.S. Patent 3,300,905, dated Jan. 31, 1967.

BACKGROUND OF THE INVENTION

Of recent years, spherical ball-type plug valves have achieved particular prominence in the process industries as replacements for more expensive and less satisfactory valve means such as tapered plug valves, gate valves, and the like. The attainment of widepread use of such valves has been in part a result of improvement in materials of construction thereof, viz, that is with respect to the metals of the balls employed, and also with the availability of certain polymeric materials from which sealing rings engaging the spherical elements are made.

In the large sizes, valves of the above described type are quite expensive with the generally spherical ball plug element being the most expensive component. Hence, in various classes of service in which the ball elements suffer mechanical abrasion or attrition, the maintenance and replacement of worn ball plugs is an expensive proposition.

An object of the present invention is to provide a new and novel apparatus for finishing the spherical contour of generally spherical elements having a port completely therethrough on an axis thereof. More particularly, a specific object of the invention is to provide an apparatus whereby gall marks, mechanical scarring or scuffing blemishes suffered during service may be removed in a highly efficient manner and a substantially spherical surface re-established.

Figure 1:
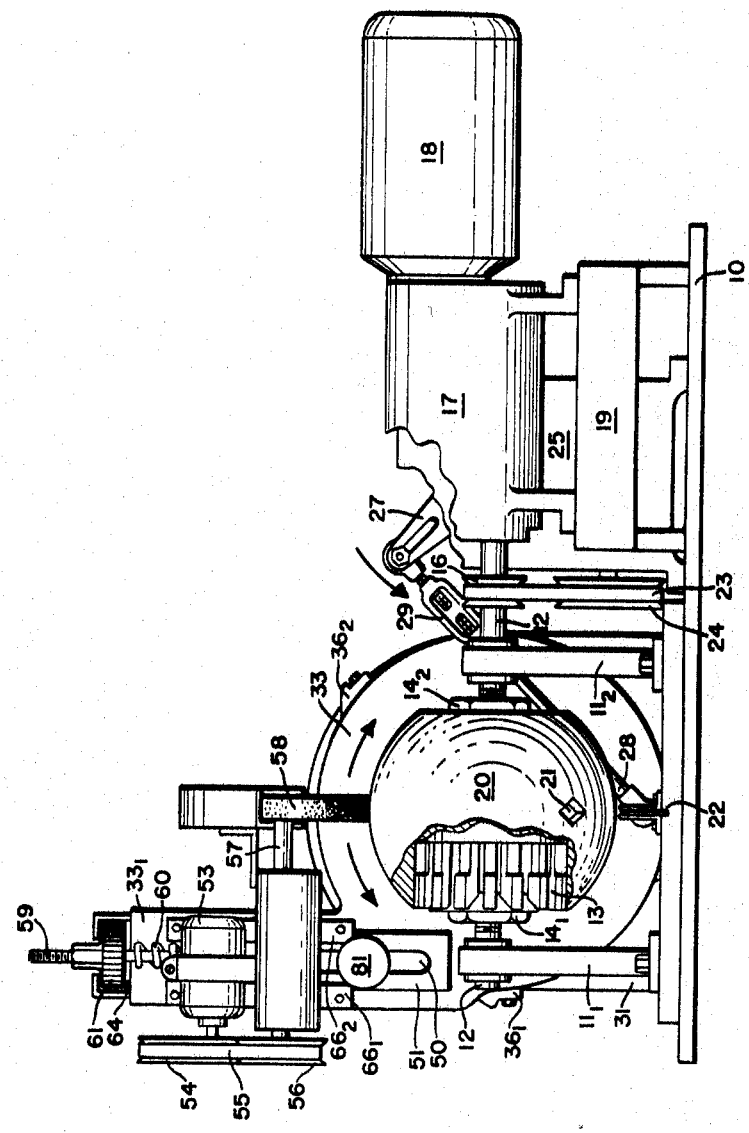
Figure 5:
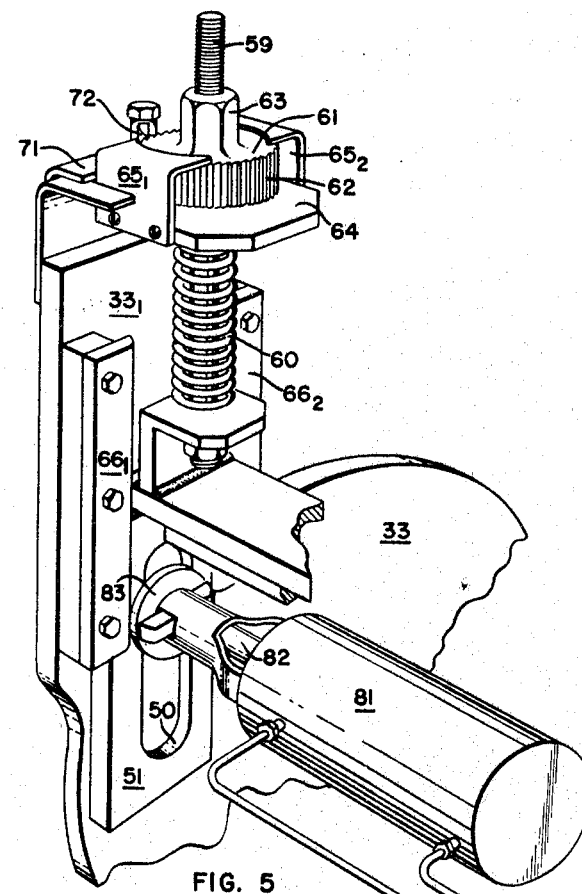
Figure 4:
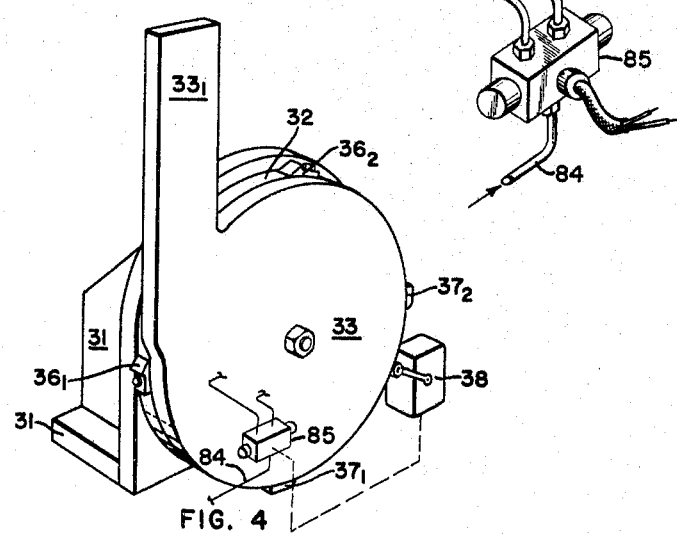

The details of the invention, and of a particular embodiment thereof will be understood clearly from the accompanying figures, wherein
 FIG. 1 is a front elevation view,
 FIG. 2 is a side elevation,
 FIG. 3 is a rear elevation view of a segment or sub-assembly of the apparatus,
 FIG. 3A is an isometric view of a segment of the apparatus shown in FIG. 3,
 FIG. 3B is a rear elevation view of a partial segment of an alternative apparatus similar to that shown in FIG. 3,
 FIG. 4 is an isometric view of the same sub-assembly shown in FIG. 3, and
 FIG. 5 is a further enlarged illustration of an additional sub-assembly of the apparatus.

The apparatus of this invention for surface grinding generally spherical elements comprises, in combination,
 (a) means for rotatably supporting a generally spherical element on an axis substantially through the center of said generally spherical element,
 (b) means for rotating the rotatably supported generally spherical element on said axis,
 (c) rotating grinding means for rotatably grinding the surface of said generally spherical element,
 (d) pivotably movable mounting means for supporting said rotating grinding means on a pivotable axis passing substantially through said center of said rotatably supported generally spherical element when said pivotable axis is extended,
 (e) means for oscillating said pivotably movable mounting means in a arcuate path around said pivotable axis,
 (f) adjusting means on said pivotably movable mounting means and in operable combination with said rotating grinding means and said pivotably movable mounting means for changing the distance between said rotating grinding means and said pivotable axis,
 (g) locking means in operable combination with said pivotably movable mounting means and said rotating grinding means for locking the position of said rotating grinding means on said pivotably movable mounting means.

A more preferred apparatus of this invention is that described above further characterized by said locking means being activated by the oscillation of said pivotably movable mounting means. Another more preferred embodiment of this invention is that apparatus described above further characterized by said adjusting means being activated by the oscillation of said pivotably movable mounting means.

Referring to FIG. 1 and to FIG. 2 as necessary, the apparatus of this invention is supported on a base plate or table member 10, and the principal components include means for supporting the generally spherical element 20, means for rotating the generally spherical element, means for oscillating a grinding means on an arcuate path sweeping past the spherical portion of the generally spherical element, means for adjustably moving the grinding means toward the center of the spherical element upon the completion of a stroke, if desired, and means for locking the grinding means securely in a position on the means for oscillating the grinding means.

The spherical element, as heretofore described, is spherically shaped and may be the ball of a ball-type plug valve having a cylindrical port therein and an aperture 21, the latter being a rectangular or square hole in the surface whereby a valve stem may engage and twist the ball in its normal functioning in a ball valve.

Two standards $11_1$, $11_2$ are provided for supporting an axle 12, upon which is mounted an expandable mandrel, including an expansible section 13, and conical nut members $14_1$ and $14_2$. By rotation of the nut members $14_1$ and $14_2$ toward the center of the spherical element, the expandable section members are uniformly expanded and center the spherical element 20 axially on the axle 12. Lateral positioning may be achieved by inspection; however, a latching registration means or gauge 22 may be provided. By engagement of this member with aperture 21, lateral registration of the spherical element 20 is secured in a uniform manner.

Axle 12 is an extension of or coupled to the axle of a gear reducer 17, driven by motor 18, the gear reducer-motor set being mounted on a sub-base 19 for appropriate positioning.

Pulley 16, also mounted on the axle 12, rotates and drives, by V-belt 23, the drive pulley 24 of a speed reducer 25, having an output shaft 26 at right angles to the input shaft mounting pulley 24.

A second mounting assembly or standard 31 is provided for the portion of the apparatus including the grinding means for surfacing the ball. The standard 31 has affixed thereto a fixed plate 32, upon which is pivotably mounted an additional plate member 33 having an arm extension $33_1$.

The orientation of standard 31 and the fixed and oscillating plates 32 and 33 will be more fully understood from FIGS. 2, 3 and 4.

Referring to FIG. 4, the general orientation of standard 31 and the several plates referred to will be readily seen. Fixed plate 32 is provided with a plurality of cam members $36_1$, $36_2$, which may actuate, as hereafter described, mechanism for traverse grinding means to take successive cuts along its arcuate path, if desired, and oscillating plate member 33, in this embodiment, also may be provided with two cam members $37_1$, $37_2$ for actuating a switch means 38, for initiating and controlling operation of a supplemental locking means as hereafter described.

Referring again to FIG. 1 and to FIG. 2, slidably mounted on the extension arm $33_1$ of the oscillating plate 33 is a support plate 51, having an extension platform member 52 fixedly attached to and extending therefrom in the direction of the spherical element 20. Mounted on the platform is a grinder drive motor 53, driving a pulley 54, which in turn drives, by a V-belt 55, a second pulley 56, on a shaft 57 which also mounts a grinding wheel 58. The position of platform 52 on extension arm $33_1$ is established by a bolt member 59, attached to the platform, spring member 60 being provided to depress the platform and slidable plate assembly 51, 52, against the action of the bolt member. The bolt engages a nut member 61, having a toothed periphery 62, as well as a segment 63.

The interrelation of the bolt member and nut member is illustrated more specifically by FIG. 5. Nut member 61 engages and rests on bracket 64 at the uppermost terminus of the extension arm $33_1$, and the retaining members $65_1$ and $65_2$, affixed to the bracket 64, secure nut member 61 in vertical position.

The slidable positioning of the plate 51 against the arm extension $33_1$ is provided by slide ways $66_1$ and $66_2$ engaging and retaining slide plate 51.

The additional segments of the operative mechanism associated with the plate extension $33_1$, already mentioned with respect to FIG. 5, is illustrated further by FIG. 3 which is a rear view elevation including extension arm $33_1$. Mounted on arm $33_1$ is slidable member 67 retained in place by two guide members $68_1$ and $68_2$, and having mounted at its lower end a separate roller 69 which engages the circular surface of the fixed plate 32. It will be seen that as the plate 33 and the extension arm thereof $33_1$ oscillate through an arc of approximately 120° an engagement with the cam members $36_1$ and $36_2$ will cause movement of slidable member 67 along the extension arm $33_1$. The terminus of the slidable member 67 engages crank arm 73 pivotably attached to extension arm $33_1$ and retained by spring 70 in yieldable engagement with the terminus of the slidable member 67. A slidable angle 71 is mounted on the upper extremity of the extension arm and has pawl 72 attached thereto which engages the toothed periphery 62 of nut member 61. Pawl 72 is yieldably pressed against the toothed periphery 62 by spring means 74. A preferred type of spring 74 is more readily viewed in FIG. 3A. Thus, as the crank arm 73 is oscillated by the cam action already described at each terminus of an oscillating arc pawl 72 causes minute rotation of the nut member 61. Nut 61 in turn causes movement of bolt member 59 which determines the position of support plate 51 for the grinding mechanism. It is clear to those skilled in the art that other suitable means may be provided to actuate crank arm 73 in relation to the oscillation of plate 33 and fixed members of the apparatus such as electrical or pneumatic apparatus or combinations thereof. For example, as shown in FIG. 3B, a solenoid 75 operated by an electrical source from line 76 can be used to move the slidable member 67 when desired.

As previously mentioned, supplemental locking means are provided in this embodiment to fixedly locate the position of grinding wheel 58 during an arc movement of plate 33 and associated apparatus. This supplemental mechanism includes air cylinder 81 supported from oscillating plate 33 through slot 50 in plate 51. The piston rod 82 of the air cylinder mechanism is capable of pressing a washer 83 firmly against the surface of the plate 51 when air pressure is applied in air cylinder 81. Air pressure is applied through a hosing 84 from a conventional source with control being effected by means of a valve 85, whose action may be initiated by the switch means 38, if desired. Manual activation of air cylinder 81 may be provided also, if desired, to permit location or relocation of the grinding means at any position in the oscillation cycle. Such pressure locks support plate 51 and oscillating plate 33 securely together. For automatic operation cams $37_1$ and $37_2$ mounted on the periphery of oscillating plate 33, may engage limit switch mechanism 38 at positions associated with the arcuate positions of cams $36_1$ and $36_2$, which actuate the described movement mechanism for adjusting the position of the grinding means. The arcuate position of said cams may be such that after the grinding mechanism has been moved in the manner described, air cylinder 81 may apply pressure to slidable plate 51 and rigidly affixes its lateral position on the extension arm $33_1$.

The following describes a complete sequence of automatic operation of the apparatus.

Spherical element 20 may be mounted on the shaft by removing support bracket $11_1$, sliding spherical element 20 into position, adjusting it laterally by gauge means 22, if desired, and tightening nut members $14_1$ and $14_2$ to position the work piece axially. The support member or bracket $11_1$ is returned and fastened in position.

The position of the grinding element may be adjusted to an upper extremity on arm $33_1$ at which point only limited contact will be made with the irregular portions of a rough spherical element. This may be accomplished manually by retracting the grinding element by disengaging pawl member 72 and retracting bolt member 59 to an appropriate position by turning nut member 61. The pawl is then permitted to engage the toothed periphery 62, motor 18 is started and by means of the action of the drive devices described, spherical element 20 is rotated, the oscillating plate is oscillated and the grinding element is rotated. It is preferable to have a spherical element rotate in a direction opposite to the direction of rotation of grinding element 58; however, this is not essential. Upon the completion of each arc movement of oscillating plate 33 and attached component parts, the mechanism already described causes rotation of nut element 61 causing incremental movement of the grinding means toward the surface of spherical element 20. A total of 40 or 50 arcs of grinding movement may be sufficient to provide a finished spherical surface. The finesses of finish may be determined by the grit size of the grinding element, and frequently, a supplemental polishing operation may be provided, using hand application of a polishing paper against a rotating spherical element with the grinding element detached. This avoids the necessity of changing the grinding element to a finer grit stone. Alternatively, however, an initial grinding may be followed by a corresponding finishing operation using a finishing abrasive wheel mounted in the apparatus. While best results are obtained using a rotating, circular, grinding wheel, non-rotating grinding elements may be substituted and good results will be obtained.

It will be apparent to those skilled in the art that numerous variations in the means described for the movement of the grinding means for successive cuts may be provided and similar functioning will result and that the locking means actuated by air cylinder 81 may be omitted. The locking means, however, assures substantially absolute radial uniformity of successive cuts or grinding passes on the spherical element.

What is claimed is:
1. An apparatus for surface grinding generally spherical elements comprising, in combination,
   (a) means for rotatably supporting a generally spherical element on an axis substantially through the center of said generally spherical element,
   (b) means for rotating the rotatably supported generally spherical element on said axis,
   (c) rotating grinding means for rotatably grinding the surface of said generally spherical element,
   (d) pivotably movable mounting means for supporting said rotating grinding means on a pivotable axis passing substantially through said center of said rotatably supported generally spherical element when said pivotable axis is extended,
   (e) means for oscillating said pivotably movable mounting means in an arcuate path around said pivotable axis, and said grinding means on an arcuate path sweeping past the spherical portion of the generally spherical element,
   (f) adjusting means on said pivotably movable mounting means and in operable combination with said rotating grinding means and said pivotably movable mounting means for changing the distance between said rotating grinding means and said pivotable axis, said adjusting means being activated by the oscillation of said pivotably movable mounting means,
   (g) locking means in operable combination with said pivotably movable mounting means and said rotating grinding means for locking the position of said rotating grinding means on said pivotably movable mounting means.

2. An apparatus for surface grinding generally spherical elements comprising, in combination,
   (a) means for rotatably supporting a generally spherical element on an axis substantially through the center of said generally spherical element,
   (b) means for rotating the rotatably supported generally spherical element on said axis,
   (c) rotating grinding means for rotatably grinding the surface of said generally spherical element,
   (d) pivotably movable mounting means for supporting said rotating grinding means on a pivotable axis passing substantially through said center of said rotatably supported generally spherical element when said pivotable axis is extended,
   (e) means for oscillating said pivotably movable mounting means in an arcuate path around said pivotable axis, and said grinding means on an arcuate path sweeping past the spherical portion of the generally spherical element,
   (f) adjusting means on said pivotably movable mounting means and in operable combination with said rotating grinding means and said pivotably movable mounting means for changing the distance between said rotating grinding means and said pivotable axis,
   (g) locking means in operable combination with said pivotably movably mounting means and said rotating grinding means for locking the position of said rotating grinding means on said pivotably movable mounting means, said locking means being activated by the oscillation of said pivotably movable mounting means.

3. An apparatus for surface grinding generally spherical elements comprising, in combination,
   (a) means for rotatably supporting a generally spherical element on an axis substantially through the center of said generally spherical element.
   (b) means for rotating the rotatably supported generally spherical element on said axis,
   (c) rotating grinding means for rotatably grinding the surface of said generally spherical element,
   (d) pivotably movable mounting means for supporting said rotating grinding means on a pivotable axis passing substantially through said center of said rotatably supported generally spherical element when said pivotable axis is extended,
   (e) means for oscillating said pivotably movable mounting means in an arcuate path around said pivotable axis, and said grinding means on an arcuate path sweeping past the spherical portion of the generally spherical element.
   (f) adjusting means on said pivotably movable mounting means and in operable combination with said rotating grinding means and said pivotably movable mounting means for changing the distance between said rotating grinding means and said pivotable axis, said adjusting means being activated by the oscillation of said pivotably movable mounting means,
   (g) locking means in operable combination with said pivotably movable mounting means and said rotating grinding means for locking the position of said rotating grinding means on said pivotably movable mounting means, said locking means being activated by the oscillation of said pivotably movable mounting means.

4. The apparatus of claim 3 further characterized by said locking means and said adjusting means being activated in a predetermined sequential arrangement by said oscillation.

5. The apparatus of claim 2 further characterized by said locking means being pneumatic.

6. The apparatus of claim 3 further characterized by said locking means being unlocked by said oscillation, said adjusting means subsequently being adjusted by said oscillation and said locking means thereafter being locked by said oscillation.

References Cited

UNITED STATES PATENTS

| 398,741 | 2/1889 | Morrison et al. | 51—33 |
| 513,631 | 1/1894 | Conrader | 51—3 |
| 918,769 | 4/1909 | Sachs | 51—33 |

FOREIGN PATENTS

| 841,112 | 6/1952 | Germany. |

HAROLD D. WHITEHEAD, Primary Examiner